(12) United States Patent
Akutsu et al.

(10) Patent No.: US 8,680,731 B2
(45) Date of Patent: Mar. 25, 2014

(54) PERMANENT-MAGNETIC TYPE ROTARY ELECTRIC MACHINE

(75) Inventors: Satoru Akutsu, Chiyoda-ku (JP); Hideya Nishikawa, Chiyoda-ku (JP); Yoshihito Asao, Chiyoda-ku (JP); Masatsugu Nakano, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1075 days.

(21) Appl. No.: 12/540,112

(22) Filed: Aug. 12, 2009

(65) Prior Publication Data
US 2010/0244611 A1    Sep. 30, 2010

(30) Foreign Application Priority Data
Mar. 25, 2009    (JP) ................ 2009-074397

(51) Int. Cl.
*H02K 21/16* (2006.01)
*H02K 1/06* (2006.01)

(52) U.S. Cl.
USPC ........... 310/156.47; 310/156.46; 310/216.012

(58) Field of Classification Search
USPC ........... 310/156.38, 156.46, 156.47, 216.011, 310/216.012, 216.097
See application file for complete search history.

(56) References Cited

U.S. PATENT DOCUMENTS

| | | | |
|---|---|---|---|
| 7,106,017 B2 * | 9/2006 | Kifuku et al. ........... 318/400.22 |
| 2002/0101126 A1 * | 8/2002 | Crapo et al. ........... 310/156.01 |
| 2002/0180295 A1 * | 12/2002 | Kaneda et al. ........... 310/156.43 |
| 2006/0062683 A1 * | 3/2006 | Ugai et al. ........... 419/38 |
| 2007/0170802 A1 | 7/2007 | Potoradi |
| 2007/0205041 A1 * | 9/2007 | Nishizaki et al. ........... 180/446 |
| 2007/0205678 A1 * | 9/2007 | Takashima et al. ........... 310/71 |
| 2008/0218023 A1 * | 9/2008 | Niguchi et al. ........... 310/156.55 |

FOREIGN PATENT DOCUMENTS

| | | | |
|---|---|---|---|
| DE | 103 26 167 B4 | 10/2008 | |
| JP | 08-126279 A | 5/1996 | |
| JP | 11-069679 A | 3/1999 | |
| JP | 11234990 A * | 8/1999 | ........... H02K 21/16 |

OTHER PUBLICATIONS

Islam et al, "Permanent Magnet Synchronous Motor Magnet Designs w/ Skewing for Torque Ripple and Cogging Torque Reduction", Conf Record of the 2007 IEEE Industry Applications Conf, 42nd IAS Annual Meeting, pp. 1552-1559.*
Nashiki, JP11234990A Machine Translation, Aug. 1999.*
Mohammad S. Islam, "Design Considerations of Sinusoidally Excited Permanent-Magnet Machines for Low-Torque-Ripple Applications", IEEE Transactions on Industry Applications, vol. 41, No. 4, Jul./Aug. 2005.

(Continued)

*Primary Examiner* — Burton Mullins
*Assistant Examiner* — Eric Johnson
(74) *Attorney, Agent, or Firm* — Sughrue Mion, PLLC

(57) ABSTRACT

A permanent-magnetic type rotary electric machine includes a stator having teeth that are arranged in the peripheral direction thereof and around which armature windings of plural phases are wound, and a rotor having plural permanent magnets arranged so that the poles of the permanent magnets are alternately different in the peripheral direction thereof, higher harmonic waves being contained in a no-load induced voltage waveform. A $(6p-1)$-th higher harmonic wave and a $(6p-1)$-th higher harmonic wave (p represents a positive integer) when an electrical angle of 360° is set as a fundamental wave in the no-load induced voltage waveform are made substantially coincident with each other in amplitude and phase.

8 Claims, 10 Drawing Sheets

(56) References Cited

OTHER PUBLICATIONS

Rakib Islam, "Permanent-Magnet Synchronous Motor Magnet Designs With Skewing for Torque Ripple and Cogging Torque Reduction", IEE Transactions on Industry Applications, vol. 45, No. 1 Jan./Feb. 2009.

German Office Action issued Jul. 23, 2013 in Patent Application No. 10 2009 038 268.2.

* cited by examiner

ANGLE (° ELECTRICAL ANGLE)

PERMANENT-MAGNETIC TYPE ROTARY ELECTRIC MACHINE

BACKGROUND OF THE INVENTION

1. Field of the Invention

The present invention relates to a permanent-magnetic type rotary electric machine, and for example it relates to a motor used in an electrical power steering device for a vehicle.

2. Description of the Related Art

FIG. 20 is a schematic diagram showing a general electrical power steering device for a vehicle. In FIG. 20, the electrical power steering device is provided with a column shaft 31 for transmitting steering force from a steering wheel 30. A worm gear 32 is connected to the column shaft 31, and it transmits the output (torque, rotational speed) of a permanent-magnetic motor 34 driven by a controller 33 while changing the rotational direction to the vertical direction and decelerates the motor at the same time to increase the assist torque. Reference numeral 35 represents a handle joint, and it can transmit the steering force and also change the rotational direction. Reference numeral 36 represents a steering gear. The steering gear 36 decelerates the rotation of the column shaft 31 and simultaneously converts the rotation concerned to the linear motion of a rack 37 to obtain a required displacement. The linear motion of the rack 37 moves wheels (not shown), thereby enabling turnabout (change of travel direction) of a vehicle, etc.

In the electrical power steering device as described above, pulsation of torque occurring in the permanent-magnetic motor 34 is transmitted to the steering wheel 30 through the worm gear 32 and the column shaft 31. Accordingly, when the motor 34 generates large torque pulsation, it is impossible to obtain a smooth steering feeling.

The torque pulsation means a phenomenon that the torque is not set to a fixed value due to the effect of magnetomotive force harmonics at a rotor side and the torque varies in accordance with the angle of the rotor under the state that current is made to flow through an armature winding. For example, it is unevenness of torque occurring even when the waveform of current flowing through the armature winding is a sine wave.

In order to reduce such torque pulsation, it has been hitherto proposed to subject the rotor to skewing. For example, there has been proposed a method of preventing gradual decrease of a torque ripple constant which is caused by increase of a skew angle (for example, see JP-A-8-126279), or a method of specifying a skew angle to reduce the unevenness of torque under the state that current is made to flow through an armature coil (for example, see JP-A-11-69679).

In the conventional permanent-magnetic type rotary electric machine, the skew angle has not been set in consideration of both of amplitude and phase of the fifth and seventh higher harmonic waves of the no-load induced voltage, and thus the effect of the magnetomotive force higher harmonics at the rotor side cannot be sufficiently suppressed.

SUMMARY OF THE INVENTION

Therefore, an object of the present invention is to provide a structure of a permanent-magnetic type rotary electric machine having small torque pulsation even when magnetomotive force higher harmonics exist and higher harmonic waves are contained in the no-load induced voltage as in the case of a permanent-magnetic type rotary electric machine using a radial anisotropic ring magnet.

In order to attain the above object, according to the present invention, in a permanent-magnetic type rotary electric machine including a stator having teeth which are arranged in the peripheral direction thereof and around which armature windings of plural phases are wound, and a rotor having plural permanent magnets arranged so that the poles of the permanent magnets are alternately different in the peripheral direction thereof, higher harmonic waves being contained in a no-load induced voltage waveform, fifth and seventh higher harmonic waves when an electrical angle of 360° is set as a fundamental wave in the no-load induced voltage waveform are made coincident with each other in amplitude and phase.

According to the present invention, even when magnetomotive force harmonics exist and higher harmonic components are contained in a no-load induced voltage as in the case of a permanent-magnetic type rotary electric machine using a radial anisotropic ring magnet, the torque pulsation can be greatly reduced.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Preferred embodiments according to the present invention will be described.

First Embodiment

Figure 1:
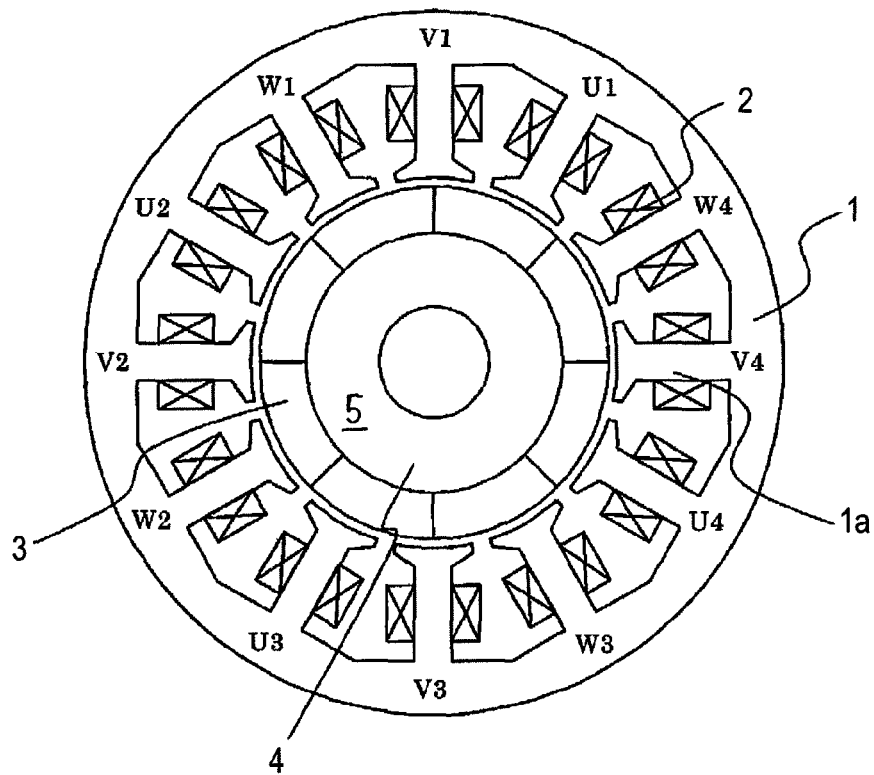
FIG. 1 is a longitudinally-sectional view showing a permanent-magnetic type rotary electric machine to be implemented in the present invention.

FIG. 1 is a cross-sectional view showing a permanent-magnetic type rotary electric machine to be implemented in the present invention. A stator iron core 1 is constructed by laminating electromagnetic steel plates, and teeth 1a projecting radially from the annular iron core are arranged on the annular iron core at an equal interval. In FIG. 1, the number of teeth is set to 12. Furthermore, an armature winding 2 is wound around each tooth 1a.

The armature winding 2 comprises three-phase windings, and when these windings are defined as U-phase, V-phase and W-phase, the arrangement of the armature winding is set like U1, V1, W1, U2, V2, W2, U3, V3, W3, U4, V4 and W4 as indicated at the roots of the teeth 1a of FIG. 1. Here, the alphabets represent the respective phases, and the numerals are expediently allocated to discriminate the armature windings whose arrangements are different although they have the same phase. U1, U2, U3, U4 may be connected to one another in parallel or in series, or in a combination style of parallel and serial connections. Furthermore, the armature windings 2 of each phase are connected to one another through Y wire connection or digital wire connection. Current varying like a sinusoidal wave in accordance with the position of the rotor flows through the armature windings 2.

The rotor 5 comprises the permanent magnet 3 and the rotor iron core 4, and the permanent magnet 3 is magnetized so that N-poles and S-poles are alternately arranged in the peripheral direction thereof. In FIG. 1, the number of poles is set to 8. Furthermore, the permanent magnet 3 is a ring-shaped magnet, and further it is a so-called radial anisotropic ring magnet in which the orientation faces in the radial direction. The rotor iron core 4 may be constructed by laminating electromagnetic steel plates or by an aggregated iron core.

Figure 2:
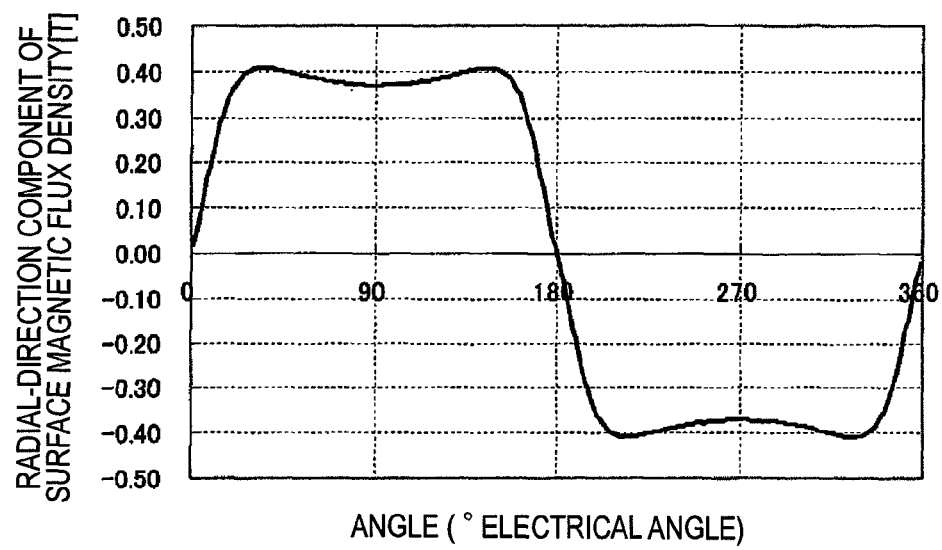
FIG. 2 shows a magnetic flux density waveform on the surface of a permanent magnet of the permanent-magnetic type rotary electric machine shown in FIG. 1.

FIG. 2 is a graph obtained by measuring the distribution of the magnetic flux density of a surface portion under the state that the rotor of the permanent-magnetic type rotary electric machine shown in FIG. 1 is taken out from a stator and thus no magnetic material exists around the rotor, that is, under the state that the rotor is magnetically released. The abscissa axis represents an angle in terms of an electric angle, and the ordinate axis represents a radial-direction component of the magnetic density. In the radial anisotropic ring magnet, the graph shows a waveform near to a rectangular waveform rather than a sinusoidal waveform as shown in FIG. 2, and thus it contains many magnetomotive force higher harmonics of the rotor. This magnetomotive force higher harmonics cause the torque pulsation.

Figure 3:
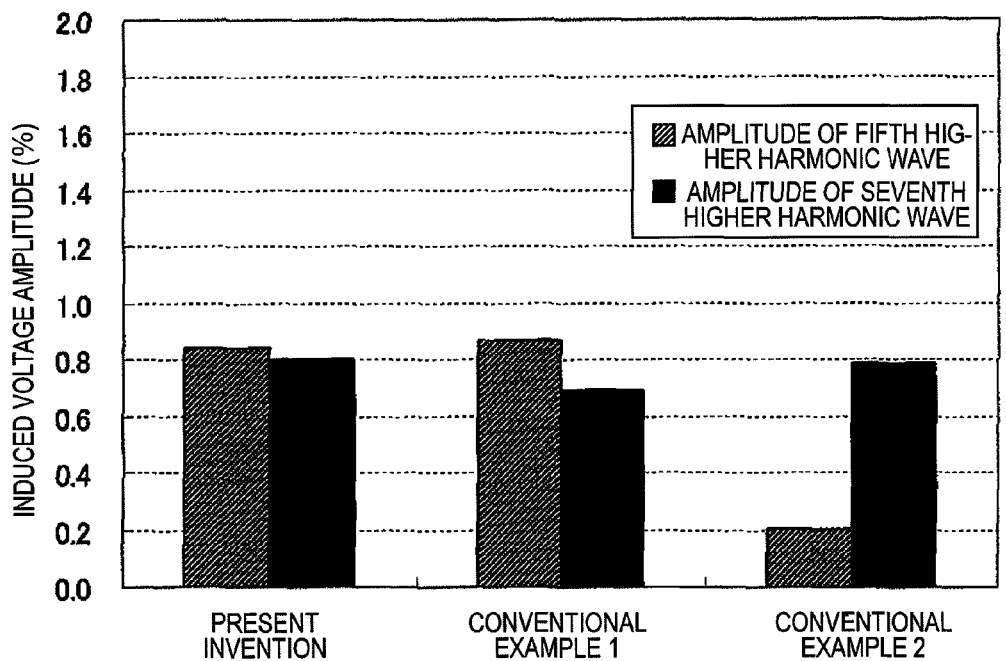
FIG. 3 shows the amplitude of fifth and seventh higher harmonic waves of a no-load induced voltage according to a first embodiment of the present invention in comparison with a conventional example.

The magnetomotive force higher harmonics shown in FIG. 2 appear as the higher harmonic components of the non-load induced voltage. FIG. 3 shows the comparison between the present invention and the conventional example when the fifth and seventh higher harmonic waves out of the higher harmonic waves of the no-load induced voltage are varied at the same level. Here, the no-load induced voltage means a so-called inter-line voltage which is measured between U-phase and V-phase, between V-phase and W-phase or between W-phase and U-phase. In a conventional example 1 of FIG. 3, the amplitude of the fifth higher harmonic wave is slightly larger than the amplitude of the seventh higher harmonic wave. In a conventional example 2, the amplitude of the fifth higher harmonic wave is substantially equal to zero, and the amplitude of the seventh higher harmonic wave is substantially equal to that of the conventional example 1. On the other hand, in the present invention, the fifth and seventh higher harmonic waves are set to be substantially equal to each other in amplitude similarly to the conventional example 1.

Figure 4:
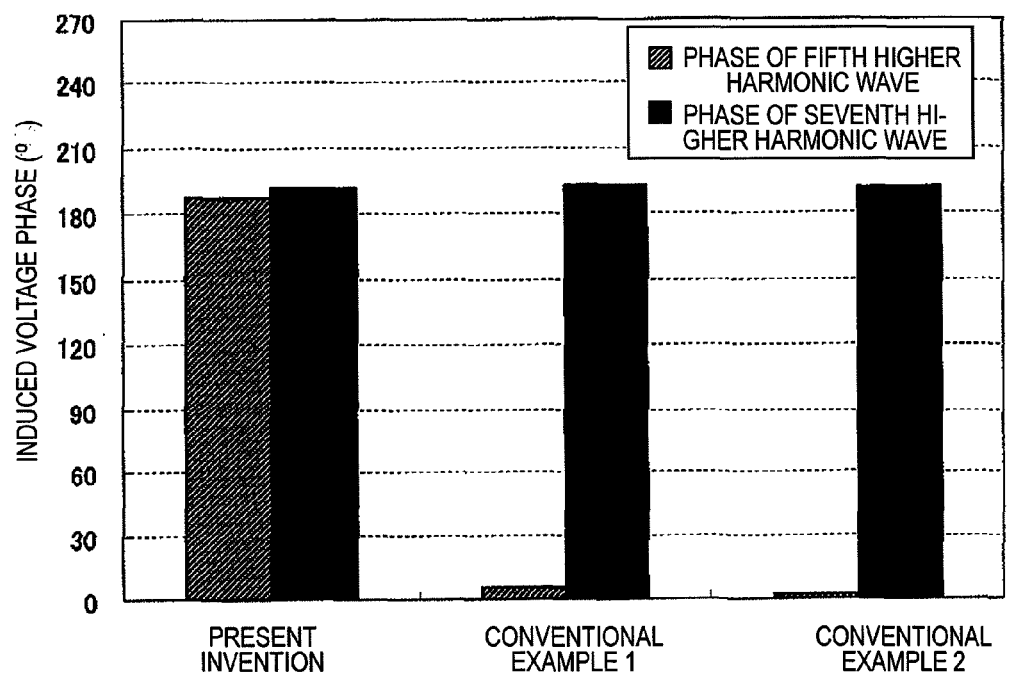
FIG. 4 shows the phases of the fifth and seventh higher harmonic waves of the no-load induced voltage according to the first embodiment of the present invention in comparison with the conventional example.

FIG. 4 shows the phases of the fifth and seventh higher harmonic waves out of the higher harmonic waves of the no-load induced voltage. Here, the definition of the phase will be described. When the fundamental wave of the no-load induced voltage (inter-line voltage) and the fifth and seventh higher harmonic waves are represented by the following equation, $\alpha 5$ and $\alpha 7$ represent the phases of the fifth and seventh higher harmonic waves, respectively.

$$V(\omega t) = V1 \sin(\omega t) + V5 \sin(5\omega t + \alpha 5) + V7 \sin(7\omega t + \alpha 7) \quad \text{Equation 1}$$

Here, in the equation 1, $\omega$ represents an electrical angle frequency, t represents the time, V1 represents the amplitude of the fundamental wave, V5 represents the amplitude of the fifth higher harmonic wave and V7 represents the amplitude of the seventh higher harmonic wave.

Figure 5:
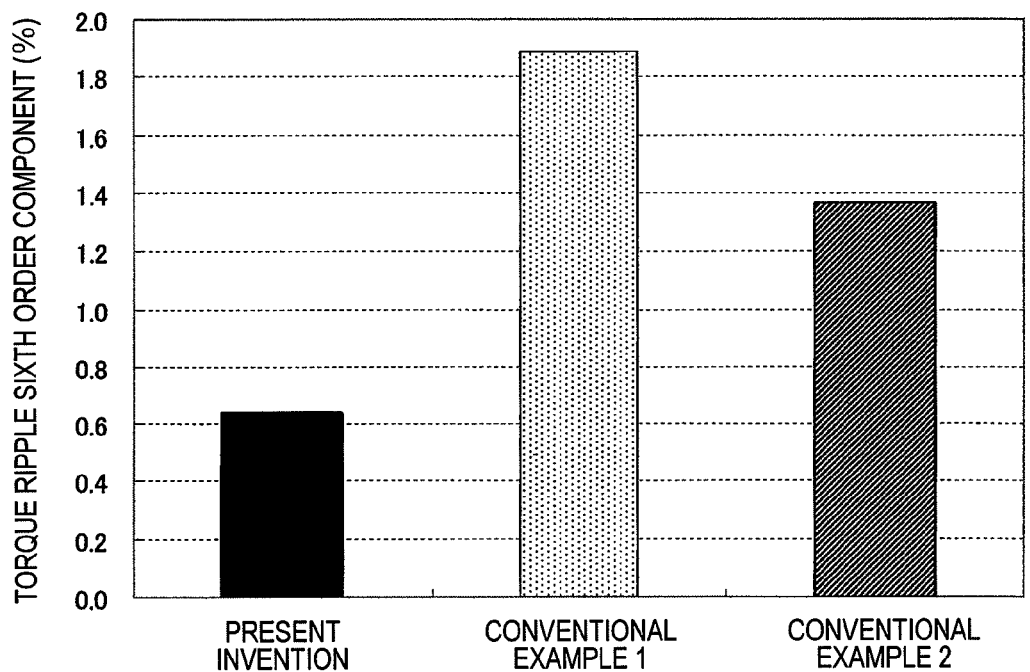
FIG. 5 is a diagram showing toque pulsation of the permanent-magnetic type rotary electric machine according to the first embodiment of the present invention in comparison with the conventional example.

In the conventional example 1 and the conventional example 2 of FIG. 4, the phase of the fifth higher harmonic wave is substantially equal to zero, however, the phase of the seventh higher harmonic wave is equal to about 180°, that is, the phase concerned is substantially inverted. On the other hand, in the present invention, the phases of the fifth and seventh higher harmonic waves are equal to about 180°, that is, the phases thereof are substantially coincident with each other. FIG. 5 shows measurement results of sixth-order components of the torque pulsation for the these three kinds of permanent-magnetic type rotary electric machines. It is apparent from FIG. 5 that the present invention can reduce the torque pulsation to about one third of that of the conventional example 1 and to about a half of that of the conventional example 2.

Accordingly, it has been confirmed that even in the case of a radial anisotropic ring magnet containing many magnetomotive force harmonics of the rotor, the sixth-order component of the torque pulsation could be greatly reduced if the fifth and seventh higher harmonic waves out of higher harmonic waves of a no-load induced voltage are set to be identical to each other in amplitude and phase even when the no-load induced voltage contains higher harmonic waves. These are not described in both of JP-A-8-126279 and JP-A-11-69679. In JP-A-11-69679, it is described that the square root of the sum of squares of the fifth and seventh higher harmonic waves is minimized. However, this construction cannot necessarily make the fifth and seventh higher harmonic waves be coincident with each other in amplitude and phase, so that the torque pulsation cannot be sufficiently reduced.

Next, there will be described the principle that the effects of the two higher harmonic waves offset each other and thus the torque pulsation can be greatly reduced by making the two higher harmonic waves be coincident with each other in amplitude and phase as mentioned above. The interlinkage flux of the U-phase winding of the motor when the fundamental wave and the fifth and seventh higher harmonic waves are considered is represented by the following equation 2.

$$\phi_u(\theta) = \phi_1 \cos\theta + \phi_5 \cos(5\theta + \alpha_5) + \phi_1 \cos(7\theta + \alpha_1) \quad \text{Equation 2}$$

Here, φu represents the interlinkage flux of the U-phase winding, $\phi_1$ represents the amplitude of the fundamental wave of the interlinkage flux, $\phi_5$ represents the amplitude of the fifth higher harmonic wave of the interlinkage flux, $\phi_7$ represents the amplitude of the seventh higher harmonic wave of the interlinkage flux, $\alpha_5$ represents the phase of the fifth higher harmonic wave of the interlinkage flux, $\alpha_7$ represents the phase of the seventh higher harmonic wave of the interlinkage flux, and θ represents the rotational angle (electric angle) of the motor.

When the rotational speed of the motor (the angular velocity of machine angle) is represented by ω, the number of polepairs is represented by P and the time is represented by t, the following equation is satisfied:

$$\theta = P\omega t \quad \text{Equation 3}$$

The induced voltage eu corresponds to a time-differential value of the interlinkage flux, and thus from the equations 2 and 3, the following equation is obtained.

$$e_u = -P\omega\phi_1 \sin\theta - 5P\omega\phi_5 \cos(5\theta + \alpha_5) - 7P\omega\phi_1 \cos(7\theta + \alpha_7) \quad \text{Equation 4}$$

With respect to current, when current iu, iv, iw of UVW phases for id=0 are represented by using iq, the following equations are obtained.

[Equation 5]

$$i_u = -\sqrt{\frac{2}{3}} i_q \sin(\theta),$$

$$i_v = -\sqrt{\frac{2}{3}} i_q \sin\left(\theta - \frac{2\pi}{3}\right),$$

$$i_w = -\sqrt{\frac{2}{3}} i_q \sin\left(\theta + \frac{2\pi}{3}\right)$$

It should be noted that the interlinkage flux φv and the induced voltage ev of the V-phase are obtained by delaying the phases of the equations 2, 4 by 2π/3, the interlinkage flux φw and the induced voltage ew of the W-phase are obtained by advancing the phases of the equations 2, 4 by 2π/3, and θ−2π/3 and θ+2π/3 are substituted into θ for the V-phase and the W-phase, respectively. When the equations 2, 4, 5 are substituted into the following equation of the torque T of the motor, $$\omega T = eu*iu + ev*iv + ew*iw \quad \text{Equation 6}$$

the following equation concerning the torque pulsation is obtained.

$$T = \sqrt{\frac{3}{2}} P i_q \{-5\phi_5 \cos(6\theta + \alpha_5) + 7\phi_7 \cos(6\theta + \alpha_7)\} + \sqrt{\frac{3}{2}} P\phi_1 i_q$$

The first term at the right side of the equation 7 represents the sixth-order torque pulsation of the electric angle, and the second term at the right side represents the average torque. Accordingly, the condition that the torque pulsation is equal to zero corresponds to the condition that the first term at the right side is equal to zero, and thus the following equation 8 is satisfied.

$$-5\phi_5 \cos(6\theta + \alpha_5) + 7\phi_7 \cos(6\theta + \alpha_7) = 0 \quad \text{Equation 8}$$

When the equation 8 is satisfied, $5\phi_5 = 7\phi_7$, $\alpha_5 = \alpha_7$. Therefore, from the equation 4, this condition corresponds to the case where the fifth and seventh higher harmonic waves of the induced voltage are coincident with each other in amplitude and phase. Accordingly, when the two higher harmonic waves are made coincident with each other in amplitude and phase, the effects of the two higher harmonic waves offset each other, and thus the torque pulsation is greatly reduced. Furthermore, in this case, it is found that even when the fifth and seventh higher harmonic waves are contained in the induced voltage, the sixth-order component of the torque pulsation can be greatly reduced.

From the equation 7, for a ratio Tr of the amplitude of the torque pulsation to an average torque, the following equation is obtained.

[Equation 9]

$$T_r = \frac{|-5\phi_5 \cos(6\theta + \alpha_5) + 7\phi_7 \cos(6\theta + \alpha_7)|}{\phi_1} \quad (9)$$

It is preferable that the torque ripple is equal to 5% or less in the electrical power steering motor in order to obtain an excellent steering feeling, and more preferably to 1% or less. Accordingly, the following equation is preferable.

[Equation 10]

$$\frac{|-5\phi_5 \cos(6\theta + \alpha_5) + 7\phi_7 \cos(6\theta + \alpha_7)|}{\phi_1} \le 0.05$$

Furthermore, the following equation is more preferable.

[Equation 11]

$$\frac{|-5\phi_5 \cos(6\theta + \alpha_5) + 7\phi_7 \cos(6\theta + \alpha_7)|}{\phi_1} \le 0.01$$

If the fifth and seventh higher harmonic waves are coincident with each other in phase, the equation 9 can be rewritten as follows by replacing the phases by the amplitude V1, V5, V7 of the induced voltage.

[Equation 12]

$$T_r = \frac{|V_5 - V_7|}{V_1}$$

Accordingly, the following equation is preferable, and

[Equation 13]

$$\frac{|V_5 - V_7|}{V_1} \leq 0.05$$

the following equation is more preferable.

[Equation 14]

$$\frac{|V_5 - V_7|}{V_1} \leq 0.01$$

On the other hand, when the fifth and seventh higher harmonic waves are coincident with each other in amplitude, in order to make the effects of the fifth and seventh higher harmonic waves offset each other, at least the following equation is satisfied:

$$|\cos(6\theta + \alpha_5) - \cos(6\theta + \alpha_1)| \leq 1 \quad \text{Equation 15}$$

Since any value is taken as θ, the following equation must be satisfied:

[Equation 16]

$$|\alpha_5 - \alpha_7| \leq \frac{\pi}{3}$$

Furthermore, if the following equation is satisfied,

[Equation 17]

$$|\alpha_5 - \alpha_7| \leq \frac{\pi}{6}$$

[Equation 18]

$$|\cos(6\theta + \alpha_5) - \cos(6\theta + \alpha_7)| \leq 2 - \sqrt{3} \approx 0.268$$

That is, there can be obtained an effect that the original effects of the fifth and seventh higher harmonic waves can be reduced to 26.8%.

Figure 6:
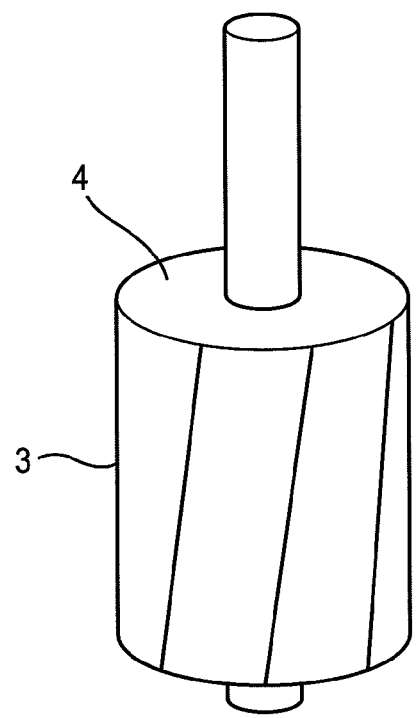
FIG. 6 is a perspective view showing a rotor of the permanent-magnetic type rotary electric machine according to the first embodiment of the present invention.
Figure 7:
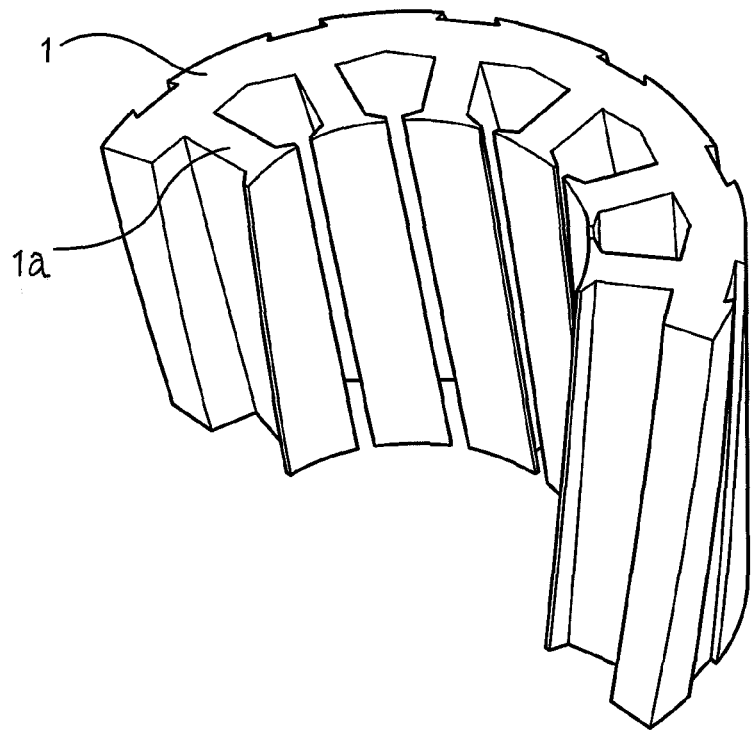
FIG. 7 is a perspective view showing a stator iron core of the permanent-magnetic type rotary electric machine according to the first embodiment of the present invention.

For example, it may be considered to use skew as means of changing the amplitude and phase of the fifth and seventh higher harmonic waves. FIG. 6 shows the rotor iron core to which rotor skew is subjected. It can be implemented by subjecting the radial anisotropic ring magnet 3 to skew magnetization. FIG. 7 shows an example in which the stator iron core 1 is designed to have a skew structure. In order to make the structure easily understandable, only a half number of teeth 1a out of twenty teeth are illustrated in FIG. 7. Such a structure can be implemented by laminating electromagnetic steel plates while gradually displacing the angle. Both the rotor and the stator may be subjected to skew.

When the ring-shaped magnet of the rotor is subjected to skew magnetization, the number of parts is reduced as compared with a case where each magnetic pole is constructed by an individual segment magnet, so that there is an effect that the mass productivity is more excellent. When the stator iron core is subjected to skew, it is unnecessary to subject the rotor to skew, and thus when a segment magnet is used, there is an effect that it is unnecessary to design a complicated shape to which skew is subjected. When both the rotor and the stator are subjected to skew, there is an effect that the same effect can be obtained even when the skew angles thereof are small.

Figure 8:
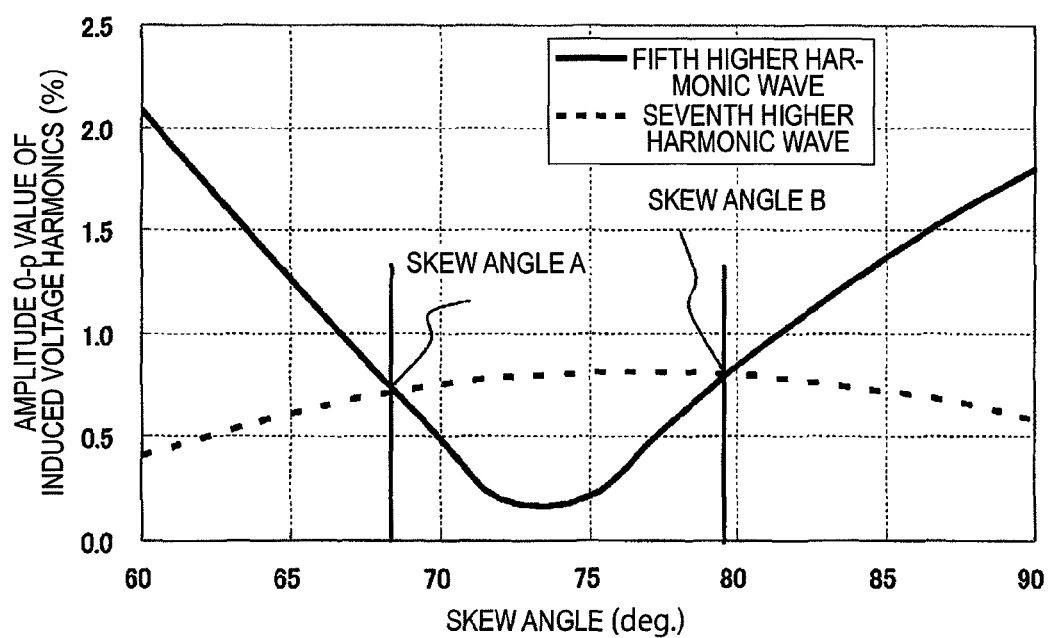
FIG. 8 is a diagram showing the amplitude of the fifth and seventh higher harmonic waves of the no-load induced voltage of the permanent-magnetic type rotary electric machine according to the first embodiment of the present invention.

FIG. 8 is a diagram showing the amplitude of higher harmonic waves of the no-load induced voltage with respect to the skew angle. In the case of the fifth higher harmonic wave, the amplitude is minimum between 70° and 75°. On the other hand, in the case of the seventh higher harmonic wave, the amplitude is maximum between 70° and 80°, however, it is substantially equal to a fixed value irrespective of the skew angle in comparison with the fifth higher harmonic wave. The fifth and seventh higher harmonic waves are coincident with each other in amplitude at two points, that is, at a skew angle A and a skew angle B.

Figure 9:
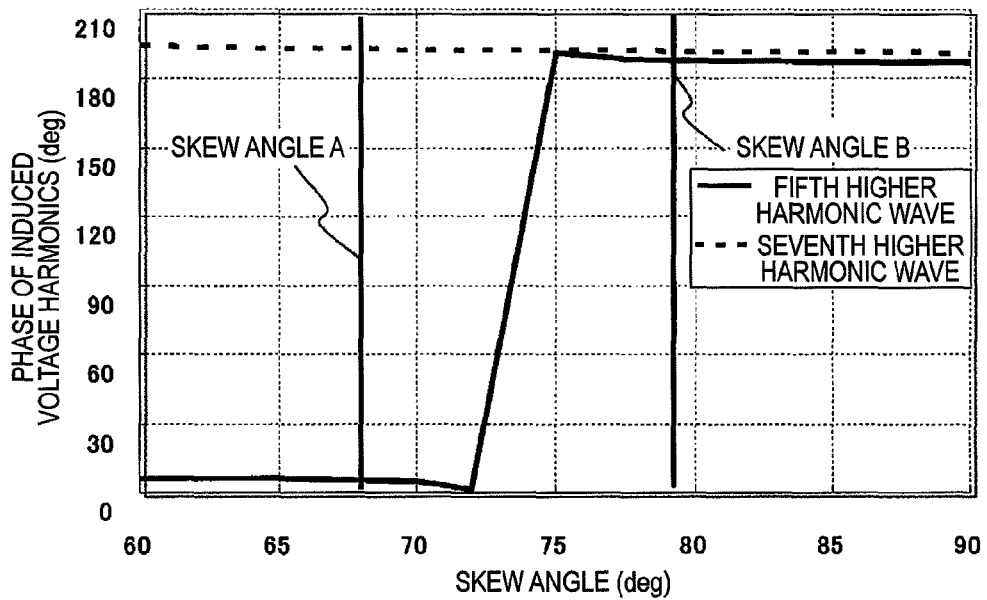
FIG. 9 is a diagram showing the phases of the fifth and seventh higher harmonic waves of the no-load induced voltage of the permanent-magnetic type rotary electric machine according to the first embodiment of the present invention.

FIG. 9 shows the phases of higher harmonic waves of the no-load induced voltage with respect to the skew angle. At the skew angle A, the difference in phase between the fifth and seventh higher harmonic waves is equal to about 180°, however, at the skew angle B, the phases of the fifth and seventh higher harmonic waves are substantially coincident with each other.

Figure 10:
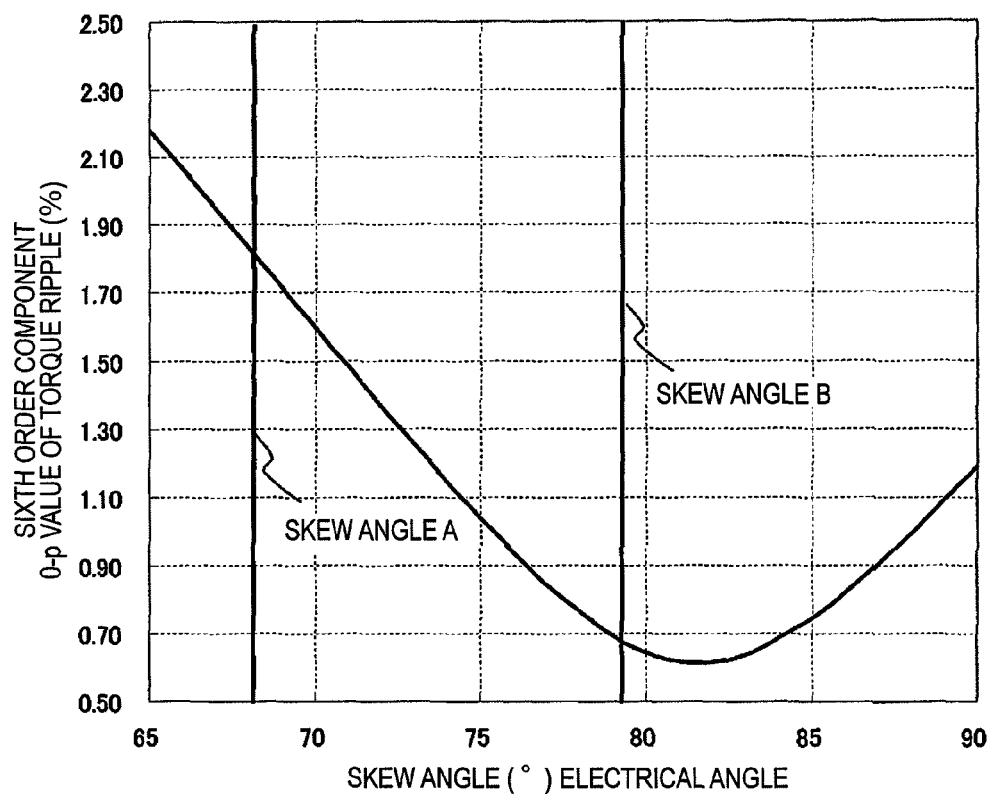
FIG. 10 is a diagram showing the relationship between a skew angle and torque pulsation (torque ripple) in the first embodiment of the present invention.

FIG. 10 shows the relationship between the skew angle and the sixth-order component of the electrical angle of the torque pulsation. It is found from FIG. 10 that the torque pulsation is great at the skew angle A, however, the torque pulsation can be greatly reduced in the neighborhood of the skew angle B. In this case, the torque pulsation is minimum in the neighborhood of 80° in skew angle. However, this does not limit actual cases. If the fifth and seventh higher harmonic waves of the no-load induced voltage are designed so as to be coincident with each other in amplitude and phase, the torque pulsation can be greatly reduced irrespective of the magnitude of the fifth and seventh higher harmonic waves contained in the magnetomotive force higher harmonics of the rotor.

The above description is made on only the fifth and seventh higher harmonic waves. However, the present invention is not limited to this embodiment. If the machine is designed so that the effects of the eleventh and thirteenth higher harmonic waves offset each other, the twelfth higher harmonic wave of the electrical angle of the torque pulsation can be reduced.

In general, if the machine is designed so that the effects of (6p−1)-th and (6p+1)-th higher harmonic waves offset each other, the 6p-th higher harmonic wave component of the electrical angle of the torque pulsation can be greatly reduced. Here, p represents a positive integer. For example, the machine may be designed so that the (6p−1)-th higher harmonic wave and the (6p+1)-th higher harmonic wave of the no-load induced voltage are coincident with each other in amplitude and phase.

Second Embodiment

Figure 11:
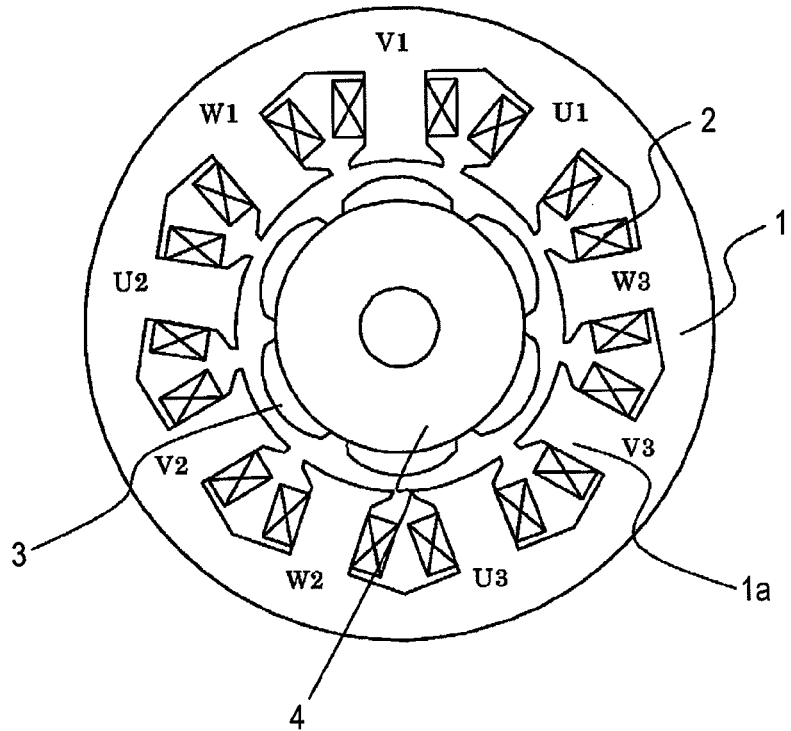
FIG. 11 is a cross-sectional view showing a permanent-magnetic type rotary electric machine having a pole number of 6 and a slot number of 9 in a second embodiment of the present invention.

In the first embodiment, the present invention is applied to the motor in which the number of poles is set to 8 and the number of teeth, that is, the number of slots is set to 12. In the second embodiment, the present invention is likewise applied to other examples. FIG. 11 shows an example in which the present invention is applied to a motor having six poles and nine slots, FIG. 12 shows an example in which the present invention is applied to a motor having ten poles and 12 slots, and FIG. 13 shows an example in which the present invention is applied to a motor having 14 poles and 12 slots.

FIG. 11 shows the motor having six poles and nine slots. With respect to a permanent-magnetic type rotary electric machine in which the relationship between the pole number m of the magnet and the slot number n of the stator satisfies 2:3 as in the case of the motor shown in FIG. 11, it trends to have a large magnetomotive force higher harmonic based on the armature winding and large torque pulsation. However, the torque pulsation can be greatly reduced as described above by making the fifth and seventh higher harmonic waves of the no-load induced voltage substantially coincident with each other in amplitude and phase as in the case of the present invention.

Figure 12:
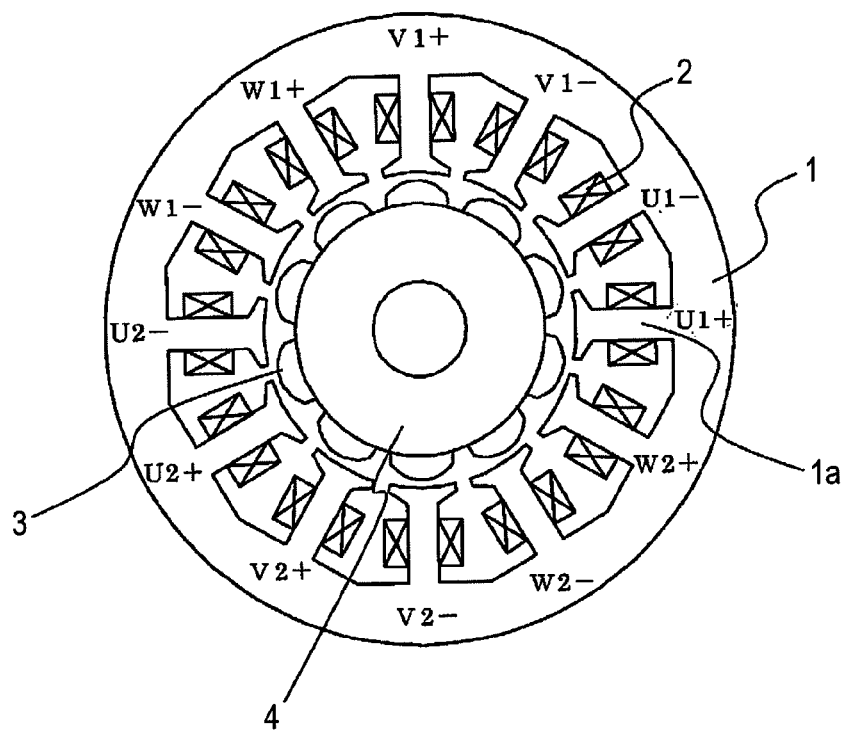
FIG. 12 is a cross-sectional view showing a permanent-magnetic type rotary electric machine having a pole number of 10 and a slot number of 12 in the second embodiment of the present invention.

In the example in which the relationship between the pole number m and the slot number n of the stator is 10:12 as in the case of the motor having ten poles and 12 slot shown in FIG. 12, the armature windings are arranged in the order of U1+, U1−, V1−, V1+, W1+, W1−, U2−, U2+, V2+, V2−, W2−, W2+. Here, + and − represents that the winding directions thereof are opposite to each other. With the above arrangement of the windings, the effect of the magnetomotive force higher harmonic wave is smaller as compared with the example in which the relationship between the pole number m and the slot number n of the stator is 2:3, and thus the toque pulsation is lowered. However, according to the construction that the fifth and seventh higher harmonic waves are substantially coincident with each other in amplitude and phase as in the case of the present invention, the torque pulsation can be more greatly reduced.

Figure 13:
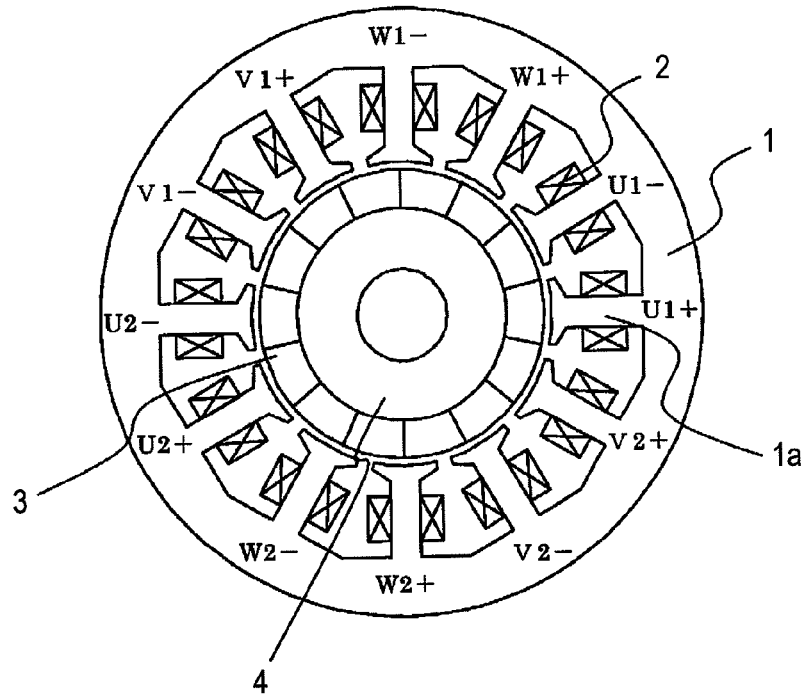
FIG. 13 is a cross-sectional view showing a permanent-magnetic type rotary electric machine having a pole number of 14 and a slot number of 12 in the second embodiment of the present invention.

In the example in which the relationship between the pole number m and the slot number n of the stator is 14:12 as in the case of the motor having 14 poles and 12 slots shown in FIG. 13, the armature windings are arranged in the order of U1+, U1−, W1+, W1−, V1+, V1−, U2−, U2+, W2−, W2+, V2−, V2+. Here, + and − represents the winding directions same as described above. With the above arrangement of the windings, the effect of the magnetomotive force higher harmonic wave is smaller as compared with the example in which the relationship between the pole number m and the stator slot number n is 2:3, and thus the torque pulsation is lowered. However, the torque pulsation can be further reduced by constructing the machine so that the fifth and seventh higher harmonic waves of the no-load induced voltage are substantially coincident with each other in amplitude and phase as in the case of the present invention.

With respect to the skew, as omitted from the illustrations, a continuously varying skew structure as shown in FIG. 6 or a step skew structure having a stepwise varying skew angle may be adopted insofar as the machine is designed so that the fifth and seventh higher harmonic waves of the no-load induced voltage are substantially coincident with each other in amplitude and phase.

Third Embodiment

In the first and second embodiments, the ring-shaped magnet is subjected to skew in order to vary the amplitude and phase of the higher harmonic waves. However, the amplitude and phase of the higher harmonic waves can be also varied by changing the sectional shape of the segment magnet. For example, "hog-backed shape" in which the thickness at the edge portion in the peripheral direction is set to be smaller than the thickness at the center portion in the peripheral direction may be considered. However, if the shape of the magnet is changed, the torque is reduced by the amount corresponding to the reduced thickness at the edge portion, and thus the ring-shaped magnet having a constant thickness has higher torque.

Figure 14:
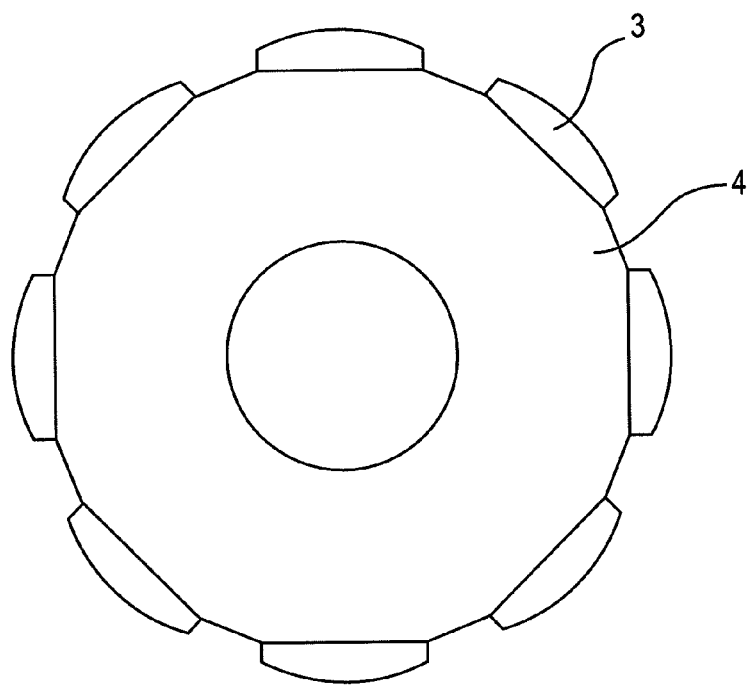
FIG. 14 shows an example of a rotor in which the cross-sectional shape of the permanent magnet is set to a hog-backed shape in a third embodiment of the present invention.
Figure 15:
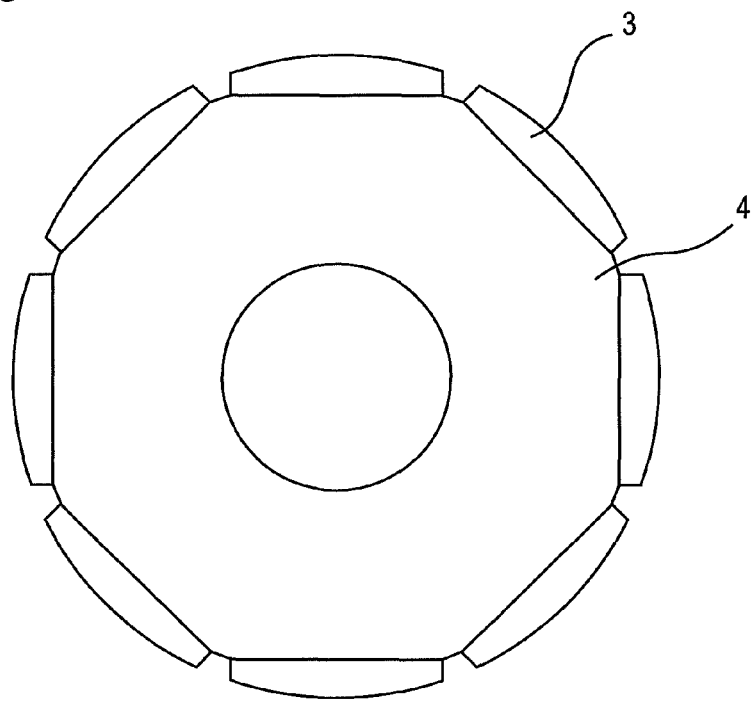
FIG. 15 shows another example of the rotor in which the cross-sectional shape of the permanent magnet is set to a hog-backed shape in the third embodiment of the present invention.

FIGS. 14 and 15 show an example of a rotor according to a third embodiment in which the sectional shape of the permanent magnet is set to the hog-backed shape. Permanent magnets 3 each of which has a so-called hog-backed sectional shape in which the thickness at the edge portion in the peripheral direction is smaller than the thickness at the center portion in the peripheral direction are arranged on the surface of the rotor iron core 4. The permanent magnets of FIGS. 14 and 15 are different in cross-section area, and the cross-sectional shape of FIG. 14 is defined as a cross-sectional shape X, and the cross-sectional shape of FIG. 15 is defined as a cross-sectional shape Y.

Figure 16:
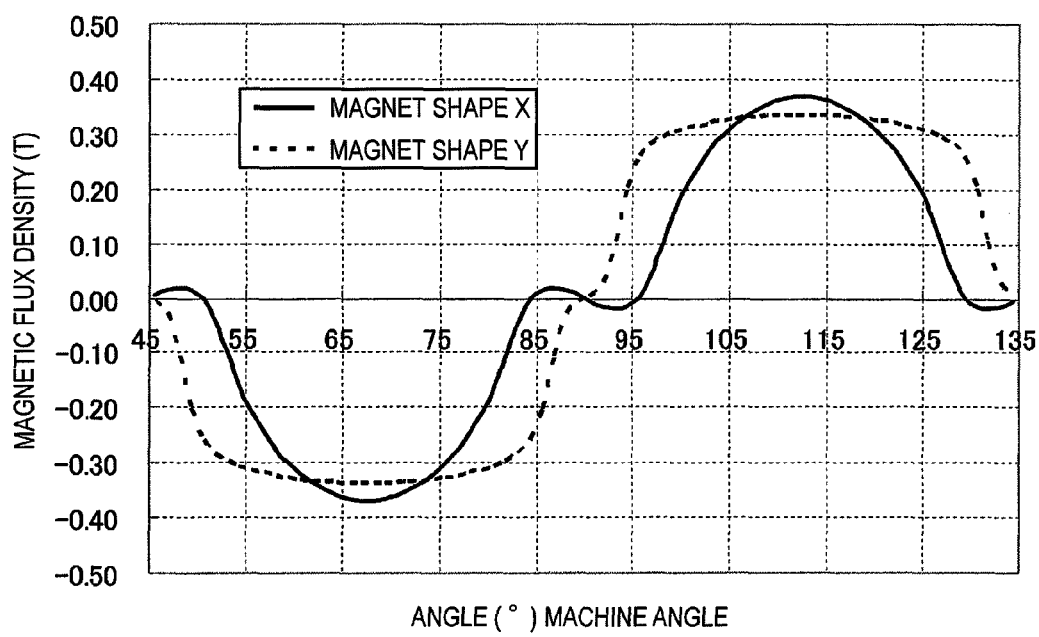
FIG. 16 is a graph showing a measurement result of the magnetic flux density of the surface of the hog-backed permanent magnet 3 in the third embodiment of the present invention.
Figure 17:
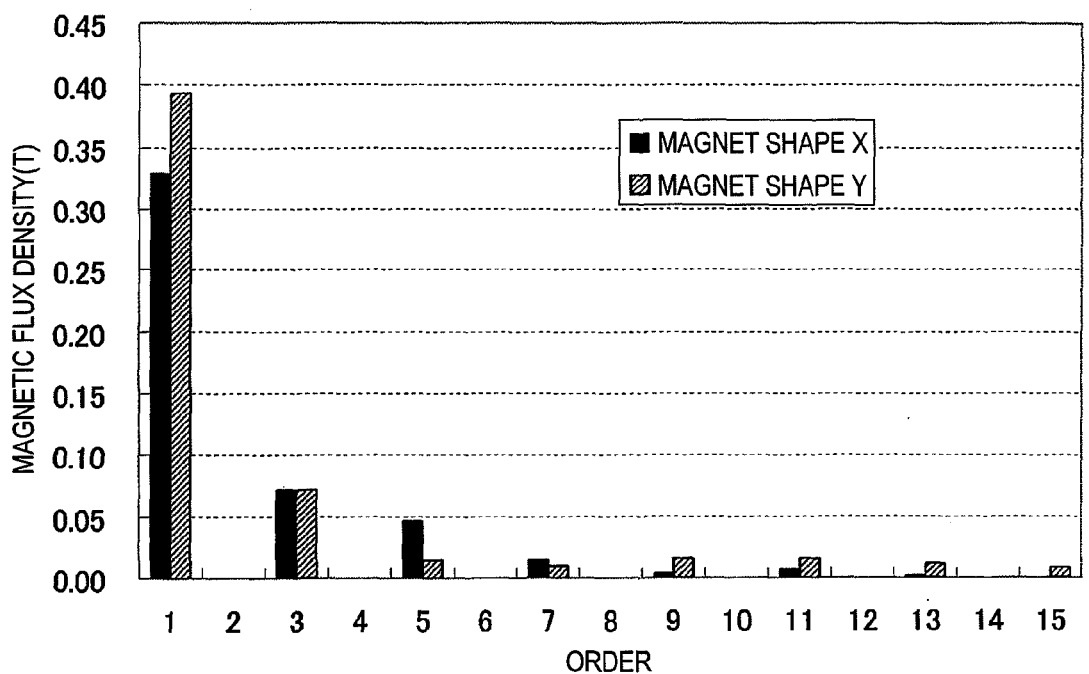
FIG. 17 is a graph showing a frequency analysis result of the hog-backed permanent magnet 3 in the third embodiment of the present invention.

The rotor 4 of FIG. 14, FIG. 15 is detached from the stator (not shown) so as to set a state under which no magnetic material is disposed around the rotor 4 (magnetically released), and the magnetic flux density of the surface of the permanent magnet 3 is measured under the above state. FIG. 16 shows the measurement result of the magnetic flux density. In FIG. 16, the abscissa axis represents the angle position in the peripheral direction in terms of the machine angle, and the ordinate axis represents the radial-direction component of the magnetic flux density. In FIGS. 14 and 15, totally eight permanent magnets 3 are arranged so that the neighboring permanent magnets 3 have different poles. However, in order to assist the understanding, only permanent magnets corresponding to two poles (that is, the amount of the electrical angle of 360°) are shown in FIG. 16. It is apparent that the magnet shape X and the magnet shape Y are greatly different in waveform. Furthermore, FIG. 17 is a graph showing a frequency analysis result. In the fifth and seventh higher harmonic waves, the magnetic density is different between the magnet shape X and the magnet shape Y, and the magnetic density of the magnet shape Y is smaller and equal to substantially the same level in the fifth and seventh higher harmonic waves.

Figure 18:
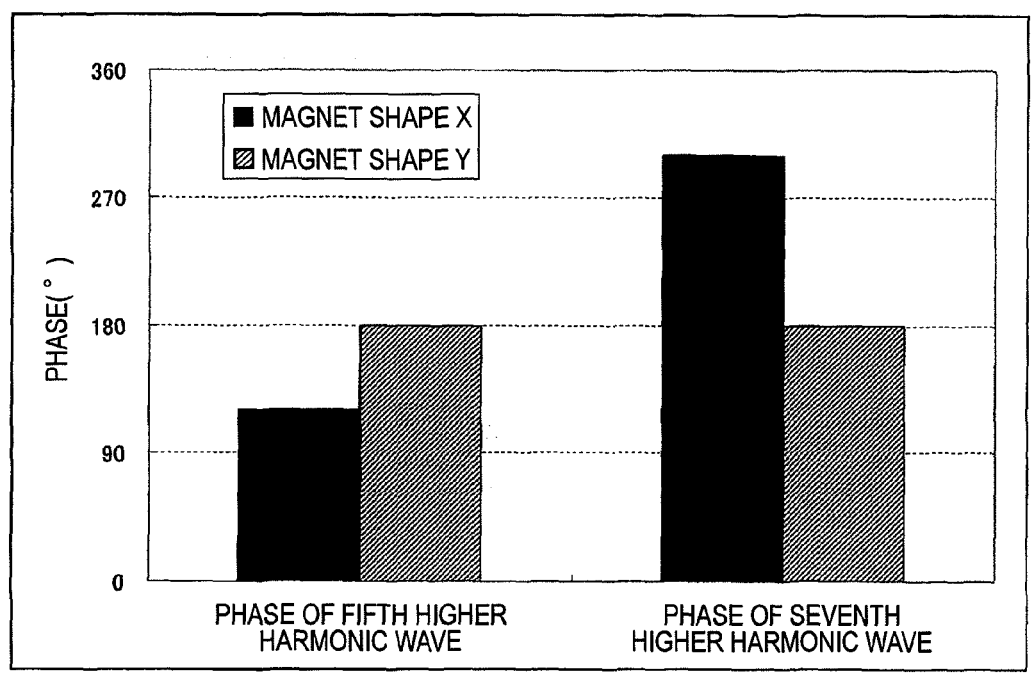
FIG. 18 is a graph showing a phase analysis result of the hog-backed permanent magnet 3 in the third embodiment of the present invention.

FIG. 18 shows the phases of the fifth and seventh higher harmonic waves. In the magnet shape Y, the phases of the fifth and seventh higher harmonic waves are coincident with each other. As described above, the magnetic flux density of the surface of the permanent magnet varies in accordance with the magnet shape, and thus the amplitude and phase of each of the fifth and seventh higher harmonic waves contained in the interlinkage flux of the armature winding vary. As a result, the fifth and seventh higher harmonic waves of the induced voltage can be varied in accordance with the magnet shape so as to be substantially identical to each other in amplitude and phase.

Furthermore, by combining the structure of the segment magnets as described above and the skew described in the first and second embodiments, the fifth and seventh higher harmonic waves of the induced voltage can be made further accurately coincident with each other in amplitude and phase, whereby the sixth-order component of the torque pulsation can be greatly reduced.

Fourth Embodiment

As described above, the permanent-magnetic type rotary electric machine having the construction that the fifth and seventh higher harmonic waves of the no-load induced voltage are substantially coincident with each other in amplitude and phase has an effect that the sixth order component of the torque pulsation can be reduced. However, it is known that the torque pulsation increases when the torque is large, that is, the q-axis current is large. This is because the B—H characteristic of the electromagnetic steel plate constituting the stator iron core has non-linearity, and thus the non-linearity is remarkable particularly in an area having a high magnetic flux density. Therefore, when the q-axis current increases, the magnetic flux density of the stator iron core increases and magnetic saturation causing the above non-linearity occurs, so that the space harmonics of the magnetic density is increased due to the magnetic saturation. This increase of the harmonics causes increase of the torque magnetic density is increased due to the magnetic saturation. This increase of the harmonics causes increase of the torque pulsation.

Figure 19:
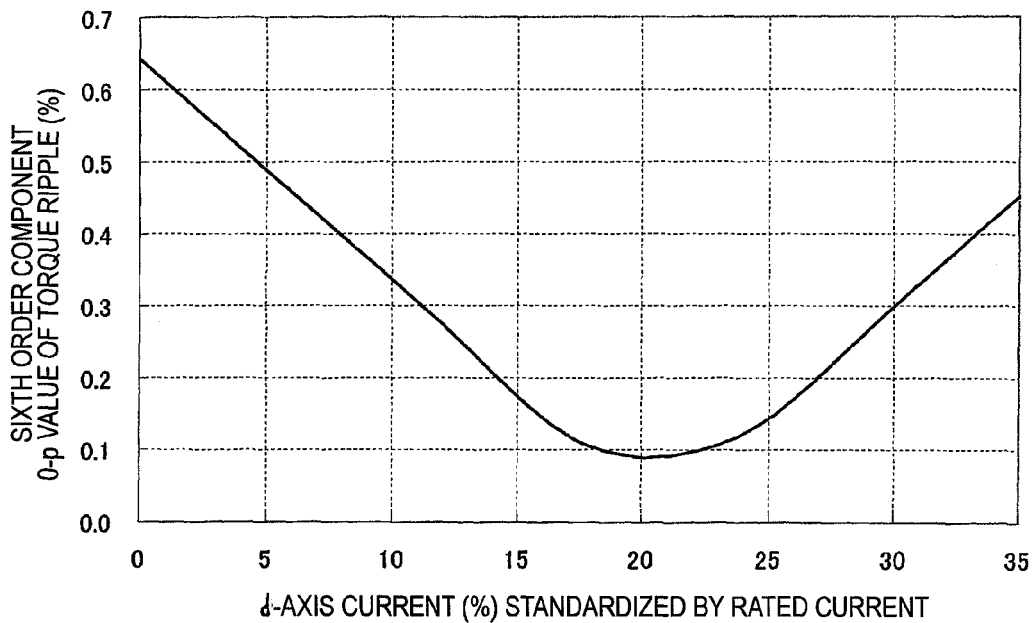
FIG. 19 is a diagram showing the relationship between d-axis current and torque pulsation of a permanent-magnetic type rotary electric machine in a fourth embodiment of the present invention.
Figure 20:
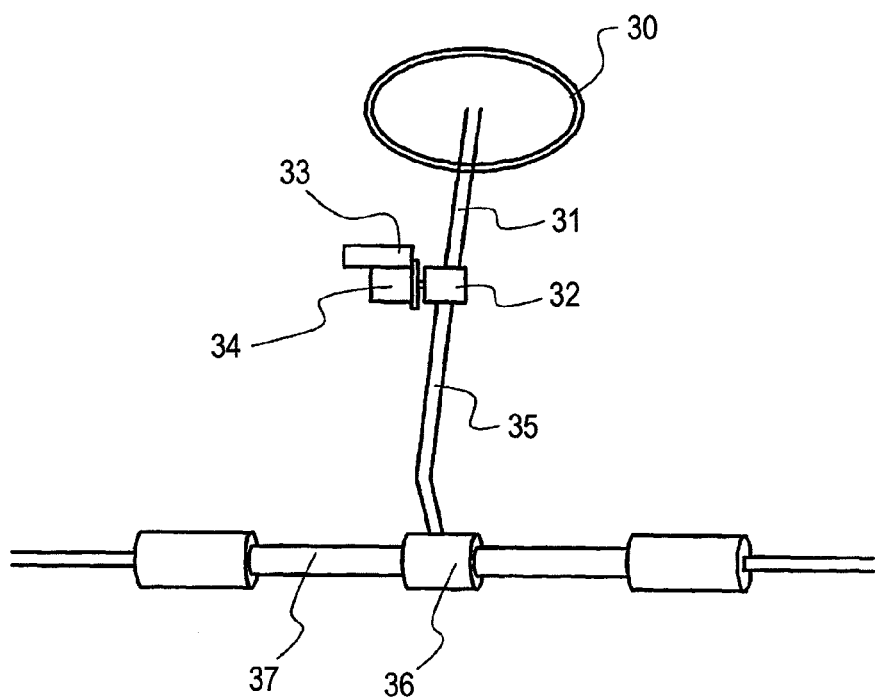
FIG. 20 is a schematic diagram showing an electrical power steering device for a vehicle which uses the permanent-magnetic type rotary electric machine according to the present invention.

It may be considered that the operation point of the B—H characteristic of the stator iron core is changed to reduce the torque pulsation caused by the non-linearity. Therefore, it has been found that the torque pulsation can be reduced by making the q-axis current unvaried and supplying the d-axis current. FIG. 19 is a characteristic diagram showing a measurement result representing how the torque pulsation varies due to this d-axis current. The abscissa axis represents the d-axis current, and the ordinate axis represents the sixth order component of the torque pulsation. It is found that the sixth order component of the torque pulsation decreases as the d-axis current increases, and it shifts to increase when passing over the minimum point. From this result, when the d-axis current of 10% to 30% of the rated current is supplied, the sixth order torque pulsation can be reduced to substantially a half of the torque pulsation when there is no d-axis current. However, the value of the d-axis current at which the torque pulsation is minimum varies in accordance with the magnitude of the q-axis current, and thus the magnitude of the d-axis current may be varied in accordance with the magnitude of the q-axis current.

According to this embodiment, the fifth and seventh higher harmonic waves of the no-load induced voltage are made substantially coincident with each other in amplitude and phase, and the d-axis current is supplied, so that there can be obtained an effect that the torque pulsation can be reduced even when the q-axis current increases.

Various modifications and alterations of this invention will be apparent to those skilled in the art without departing from the scope and spirit of this invention, and it should be understood that this is not limited to the illustrative embodiments set forth herein.

What is claimed is:

1. A permanent-magnetic type rotary electric machine comprising:
a stator having teeth that are arranged in the peripheral direction of the stator and armature windings of plural phases are wound around the teeth; and
a rotor having plural permanent magnets arranged so that the poles of the permanent magnets are alternately different in the peripheral direction of the rotor,
wherein higher harmonic waves are contained in a no-load induced voltage waveform,
wherein, when an electrical angle of 360° is set as a fundamental wave in the no-load induced voltage waveform, a (6p−1)-th higher harmonic wave and a (6p+1)-th higher harmonic wave are made substantially coincident with each other in amplitude and phase, where p is a positive integer,
wherein when the no-load induced voltage waveform is represented by $V(\omega t)$ as follows by the fundamental wave, the fifth higher harmonic wave, and the seventh higher harmonic wave:

$$V(\omega t)=V1\sin(\omega t)+V5\sin(5\omega t+\alpha 5)+V7\sin(7\omega t+\alpha 7)$$

where V1, V5, and V7 represent the amplitude of the fundamental wave, the amplitude of the fifth higher harmonic wave, and the amplitude of the seventh higher harmonic wave, respectively, and V1, V5, and V7 are real numbers,
$\alpha 5$ and $\alpha 7$ represent the phases of the fifth and seventh higher harmonic waves, respectively,
$\omega$ represents the frequency of the electrical angle, and
t represents the time,
V5, V7, $\alpha 5$, and $\alpha 7$ are respectively controlled so that V5 and V7 are substantially equal to each other and $\alpha 5$ and $\alpha 7$ are substantially equal to each other, and
wherein a skew angle is set to at least one of the rotor magnets and the stator teeth so that the (6p−1)-th higher harmonic wave and the (6p+1)-th higher harmonic wave are made substantially coincident with each other in amplitude and in phase.

2. The permanent-magnetic type rotary electric machine according to claim 1, wherein the rotor comprises a radial anisotropic ring magnet.

3. The permanent-magnetic type rotary electric machine according to claim 2, wherein the relationship m:n between a number of poles (m) of the radial anisotropic ring magnet and a number of slots (n) of the stator is 2:3.

4. The permanent-magnetic type rotary electric machine according to claim 2, wherein the relationship m:n between a number of poles (m) of the radial anisotropic ring magnet and a number of slots (n) of the stator is 10:12.

5. The permanent-magnetic type rotary electric machine according to claim 2, wherein the relationship m:n between a number of poles (m) of the radial anisotropic ring magnet and a number of slots (n) of the stator is 14:12.

6. The permanent-magnetic type rotary electric machine according to claim 1, wherein armature current flowing through an armature winding contains both d-axis current and q-axis current, the magnitude of the d-axis current is set to a value in the range from 10% to 30% of the magnitude of the q-axis current and the d-axis current is controlled in accordance with variations in the magnitude of the q-axis current.

7. A permanent-magnetic type rotary electric machine comprising:
a stator having teeth that are arranged in the peripheral direction of the stator and armature windings of plural phases are wound around the teeth; and
a rotor having plural permanent magnets arranged so that the poles of the permanent magnets are alternately different in the peripheral direction of the rotor,
wherein higher harmonic waves are contained in a no-load induced voltage waveform,
wherein, when an electrical angle of 360° is set as a fundamental wave in the no-load induced voltage waveform, a (6p−1)-th higher harmonic wave and a (6p+1)-th higher harmonic wave are made substantially coincident with each other in amplitude and phase, where p is a positive integer,
wherein when the no-load induced voltage waveform is represented by $V(\omega t)$ as follows by the fundamental wave, the fifth higher harmonic wave, and the seventh higher harmonic wave:

$$V(\omega t)=V1\sin(\omega t)+V5\sin(5\omega t+\alpha 5)+V7\sin(7\omega t+\alpha 7)$$

where V1, V5, and V7 represent the amplitude of the fundamental wave, the amplitude of the fifth higher harmonic wave, and the amplitude of the seventh higher harmonic wave, respectively, and V1, V5, and V7 are real numbers, $\alpha 5$ and $\alpha 7$ represent the phases of the fifth and seventh higher harmonic waves, respectively, $\omega$ represents the frequency of the electrical angle, and t represents the time, V5, V7, $\alpha 5$, and $\alpha 7$ are respectively controlled so that V5 and V7 are substantially equal to each other and $\alpha 5$ and $\alpha 7$ are substantially equal to each other, and wherein the cross-sectional shape of a segment magnet, from among the plural permanent magnets, is changed so that the (6p−1)-th higher harmonic wave and the (6p+1)-th higher harmonic wave are made substantially coincident with each other in amplitude and in phase.

8. The permanent-magnetic type rotary electric machine according to claim 7, wherein the cross-sectional shape of the segment magnet is set to a hog-backed shape.

\* \* \* \* \*